(No Model.)
G. SAXBY.
CLEVIS.
No. 476,899. Patented June 14, 1892.
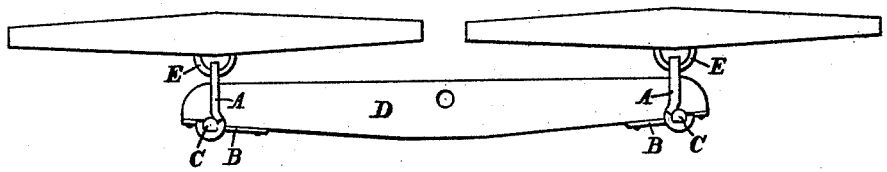
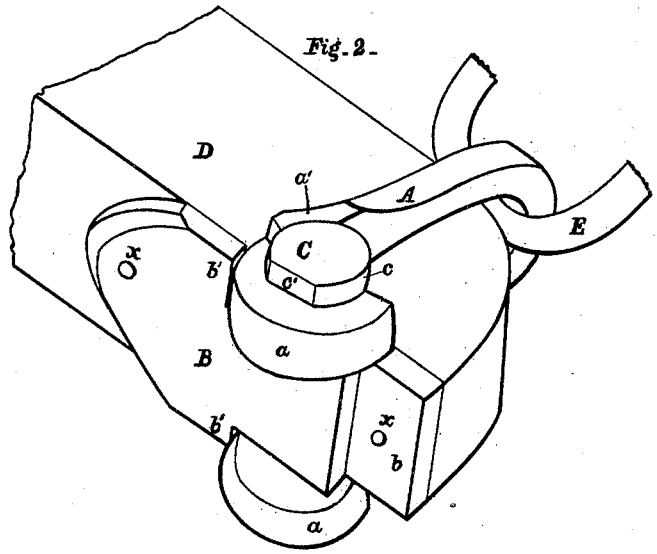
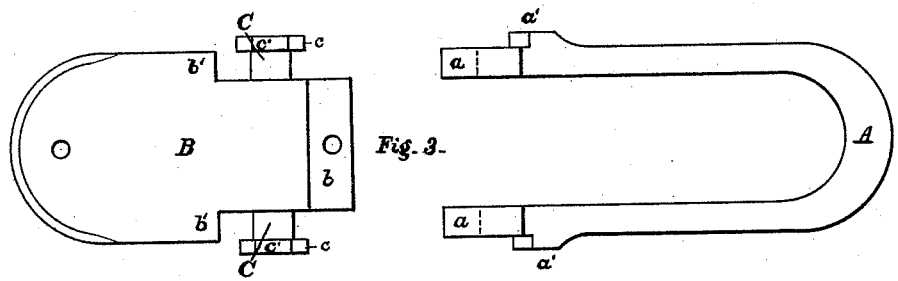
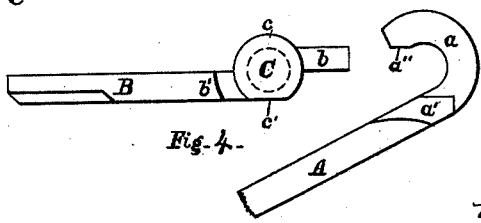
WITNESSES
S. P. Moore
A. R. Selden
INVENTOR
George Saxby
by Howard L. Osgood
his atty

UNITED STATES PATENT OFFICE.

GEORGE SAXBY, OF EAST BLOOMFIELD, NEW YORK.

CLEVIS.

SPECIFICATION forming part of Letters Patent No. 476,899, dated June 14, 1892.

Application filed March 2, 1892. Serial No. 423,542. (No model.)

*To all whom it may concern:*

Be it known that I, GEORGE SAXBY, a citizen of the United States, and a resident of the town of East Bloomfield, in the county of Ontario and State of New York, have invented a certain Improved Clevis, of which the following is a specification, reference being had to the accompanying drawings, in which—

Figure 1 is a plan view of an evener-beam and whiffletrees connected by my clevis. Fig. 2 is a perspective view of the end of an evener-beam having my clevis attached thereto. Fig. 3 is a plan view of the two parts of my clevis shown separated. Fig. 4 is a side view of the two parts of my clevis, showing the manner in which they are put together.

My invention relates to a form of clevis in which the link is fastened to studs permanently attached to the evener-beam and wherein the detachment of the link is effected without the removal of a bolt or pin.

The object of my invention is to produce a clevis independent of a removable pin.

My clevis is formed of two parts—a link A and a plate B, bearing studs C C. The link A is formed of one piece of metal U-shaped. On the two ends are hooks $a\,a$, which I prefer to make of about one-half circle in curve. On the outer sides of the link and at about the points where the curvatures of the hooks begin are lugs $a'\,a'$. The inner side of each hook is slightly chamfered, as at $a''$, Fig. 4.

The plate B has a main portion from which extends a second portion $b$. To these portions, which are made integral with each other, there is fixed a transverse stud C, integral therewith and provided with the expanded heads $c\,c$. Upon the plate B are two shoulders $b'\,b'$, each at such a distance from the stud C as to permit the hooks $a\,a$ of the link to pass between the stud and the shoulders. The plate B is fastened to the evener-beam D by means of bolts or screws $x\,x$. A small portion of each of the heads of the stud C is removed, as shown at $c'$, Figs. 2 and 4.

The parts are put together as follows: The link A is turned so that the stem of the stud C will enter into the hooks of the link. (See Fig. 4.) If now the link is turned, the ends of the hook will turn around the stud and will pass into the spaces between the shoulders $b'\,b'$ and the stems of the stud. The lugs $a'\,a'$ lie against the expanded heads $c\,c$ of the stud C, and after the link A is turned so far that the hook enters the space between the shoulders $b'\,b'$ and the stud C it will be impossible to remove the link from its position without turning it back into the position originally mentioned. As shown in Figs. 1 and 2, the plate B is fastened to the back of the evener-beam D, the link A is inserted through the staple E of the whiffletree, the plates are then brought into position as shown in Fig. 4, the hooks of the link are slipped over the stud C, and the link is turned into the position shown in Figs. 1 and 2, the end of the evener-beam being rounded to permit this movement. It will be impossible to remove the link A from its position without turning it for more than one-half circle, and therefore it will be practically impossible to disengage the parts except by intentional movement thereof. The flat faces $c'\,c'$ on the heads of the studs C and the faces of the lugs $a'\,a'$ are so formed with relation to each other that the hook $a$ of the link can only be placed over the stem of the stud C when the face $c'$ of the head of the stud C and the face of the lug $a'$ are brought in line with each other, and the lug $a'$ is thus allowed to pass the head of the stud C. The hooks $a\,a$ are preferably made of such curve that the chamfered side $a''$ is necessary to permit the parts to come into place. It will be thus seen that the parts are held firmly in place.

This clevis can be made very cheaply and very strong at the same time. The parts can be separated while in operative position only by breaking and the common trouble of the pin dropping out is obviated.

What I claim is—

1. In a clevis, the combination of a supporting-plate B, a stud C, integral therewith, and a removable link A, having terminal hooks $a\,a$, all arranged and operating substantially as described.

2. In a clevis, the combination of the plate B, having the shoulders $b'\,b'$, the stud C, integral therewith, and the link A, having the hooks *a a*, all arranged and operating substantially as described.

3. In a clevis, the combination of the plate B, the stud C, integral therewith and having expanded heads, the link A, having the hooks *a a*, and the lugs *a' a'*, all arranged and operating substantially as described.

4. In a clevis, the combination of the plate B, having the shoulders *b' b'*, the stud C, integral therewith and having expanded heads *c c*, the link A, having the hooks *a a*, and the lugs *a' a'*, all arranged and operating substantially as described.

GEORGE SAXBY.

Witnesses:
WILLIAM B. HALE,
G. S. BOUTER.